United States Patent [19]

Mitsuda et al.

[11] 4,162,612
[45] Jul. 31, 1979

[54] EXHAUST GAS CLEANING APPARATUS FOR AN INTERNAL COMBUSTION ENGINE

[75] Inventors: Tadao Mitsuda, Susono; Takeru Yasuda, Nagoya; Yoshiki Fukumori, Obu, all of Japan

[73] Assignees: Toyota Jidosha Kogyo Kabushiki Kaisha, Toyota; Aisan Industry Co., Ltd., Obu, both of Japan

[21] Appl. No.: 845,233

[22] Filed: Oct. 25, 1977

[30] Foreign Application Priority Data

Jul. 5, 1977 [JP] Japan .................................. 52/79475

[51] Int. Cl.² .............................................. F01N 3/15
[52] U.S. Cl. ...................................... 60/276; 60/290
[58] Field of Search ......................... 60/276, 289, 290

[56] References Cited

U.S. PATENT DOCUMENTS

| | | | |
|---|---|---|---|
| 3,921,396 | 11/1975 | Nohira | 60/290 |
| 3,962,867 | 6/1976 | Ikeura | 60/290 |
| 4,112,678 | 9/1978 | Miyagi | 60/276 |

Primary Examiner—Douglas Hart
Attorney, Agent, or Firm—Stevens, Davis, Miller & Mosher

[57] ABSTRACT

Disclosed is an exhaust gas cleaning apparatus of an internal combustion engine, provided with a three-way catalytic converter, an air-fuel ratio sensor and a secondary air injection system. The secondary air injection system has a diaphragm-operated flow control valve for increasing or decreasing the amount of secondary air introduced into the exhaust manifold of the engine in accordance with electrical signals transmitted from the air-fuel ratio sensor. Means are provided for rapidly increasing or decreasing the air-fuel ratio to a stoichiometric value at the moment when the amount of secondary air passed through the flow control valve is increased or decreased. Therefore, the air-fuel ratio is maintained quite near the stoichiometric value at which the three-way catalytic converter can effectively operate to clean the three major toxic components in the exhaust gas.

9 Claims, 6 Drawing Figures

EXHAUST GAS CLEANING APPARATUS FOR AN INTERNAL COMBUSTION ENGINE

FIELD OF THE INVENTION

The present invention relates to an exhaust gas cleaning apparatus for an internal combustion engine, which includes a three-way catalytic converter arranged in the exhaust system of the engine.

BACKGROUND OF THE INVENTION

Already known in the prior art is a three-way catalytic converter which can clean three major toxic components (HC, CO and $NO_x$) in the exhaust gas. The operation of the three-way catalytic converter is effectively attained when the exhaust gas is in a state wherein excess air as well as excess fuel is not left in the exhaust gas, i.e., the air-fuel ratio of the exhaust gas (the ratio of air remaining in the exhaust gas to fuel remaining in the exhaust gas) is maintained near the stoichiometric value.

For maintaining the air-fuel ratio near to the stoichiometric value, an air injection system having a vacuum-operated flow control valve has been provided in the prior art for increasing or decreasing the amount of secondary air introduced into the engine exhaust manifold by selectively introducing an engine vacuum signal into a vacuum chamber of the flow control valve in accordance with electrical signals transmitted from an $O_2$ sensor disposed in the exhaust pipe.

In order to prevent the occurrence of the so-called "overshoot" due to the ON-OFF operation of the flow control valve, it is necessary to control the rate of increase and the rate of decrease in the amount of secondary air. Therefore, the system has an orifice means for maintaining a slow rate of increase or decrease of the vacuum level in the vacuum chamber of the flow control valve.

However, in such a system, it is advantageous to control the amount of secondary air so that a rapid increase or decrease of a small amount of secondary air occurs when the flow control valve operates to begin to increase or decrease the amount of the secondary air, because such a rapid increase or decrease of the small amount of air causes the air-fuel ratio to be quickly controlled to the stoichiometric value, thus making it possible for an idealized operation of the three-way catalytic converter to occur. This rapid control of the limited amount of secondary air is required when the engine is operating under an acceleration condition because the secondary air directed into the flow control valve from an air pump driven by a crankshaft of the engine is relatively small due to the low rotational speed of the crankshaft during such an accelerating condition. The low rotational speed of the air pump causes the amount of secondary air to be increased slowly, therefore, a quick adjustment of the air-fuel ratio to the stoichiometric value cannot be carried out. As a result, the three-way catalytic converter cannot operate to clean the three major toxic components in the exhaust gas.

SUMMARY OF THE INVENTION

An object of the present invention is to provide an exhaust gas cleaning apparatus of a particular type which comprises an air injection system for controlling the air-fuel ratio of the exhaust gas directed to the three-way catalytic converter, and which can control the air-fuel ratio of the exhaust gas directed to the three-way catalytic converter so that the ratio is quickly controlled to the stoichiometric value.

Another object of the present invention is to provide an exhaust gas cleaning apparatus which is capable of effecting a rapid increase or decrease of a small amount of secondary air when the air-injection system begins to increase or decrease the amount of the secondary air.

Still another object of the present invention is to provide an exhaust gas cleaning apparatus which is capable of effecting the above-mentioned rapid increase or decrease of a small amount of secondary air during the time when the engine is accelerated.

An exhaust gas cleaning apparatus for an internal combustion engine is provided in accordance with the present invention, which apparatus comprises:

a three-way catalytic converter, arranged in the exhaust system of the engine, for effectively eliminating toxic components remaining in the exhaust gas when the air-fuel ratio of the exhaust gas directed to the converter is kept near a stoichiometric value;

an air pump means driven by the crankshaft of the engine;

a pipe means connected on one end thereof to the air pump means for receiving secondary air from the air pump means and connected on the other end thereof to the exhaust system at a position located upstream of the catalytic converter for introducing secondary air into the exhaust system;

a flow control valve means having an air chamber located on the pipe means, which valve has a diaphragm for forming a vacuum chamber on one side thereof, the diaphragm operating to control the amount of secondary air directed from the air chamber toward the exhaust sysem in accordance with the vacuum pressure level in the vacuum chamber;

a vacuum switching valve means capable of selectively introducing a vacuum signal from the intake system into the vacuum chamber for controlling the vacuum level in the vacuum chamber;

a sensor means arranged in the exhaust system for detecting a predetermined value of the air-fuel ratio which is near the stoichiometric value;

a control unit for operating the vacuum switching valve in such a manner that the switching valve is in its first position when a first electric signal, which indicates that the air-fuel ratio is smaller than the predetermined value, is received by the control unit for increasing the amount of secondary air directed into the exhaust system from the air chamber of the flow control valve, and in such a manner that the signal switching valve is in its second position when another electric signal, which indicates that the air-fuel ratio is larger than the predetermined value, is received by the control unit for decreasing the amount of secondary air directed into the exhaust system from the air chamber;

a by-pass valve means for selectively connecting the air chamber of the flow control valve with the atmosphere; and an actuator means connected to the control unit for operating the by-pass valve in such a manner that the by-pass valve is situated so that the air chamber is disconnected from the atmosphere upon receipt of the first electric signal by the control unit for causing a rapid increase of a small amount of secondary air directed to the exhaust system, for quickly increasing the air-fuel ratio to a value near the stoichiometric value, and in such a manner that the by-pass valve is situated so that the air chamber is connected with the atmosphere upon receipt of the second electric signal by the control means for causing a rapid decrease of a small amount of secondary air for quickly decreasing the air-fuel ratio to a value near the stoichiometric value.

As a result of this construction, a quick control of the air-fuel ratio of the exhaust gas directed to the three-way catalytic converter is attained. Thus, a majority of the three major toxic components can be eliminated.

DESCRIPTION OF A PREFERRED EMBODIMENT

Figure 1:
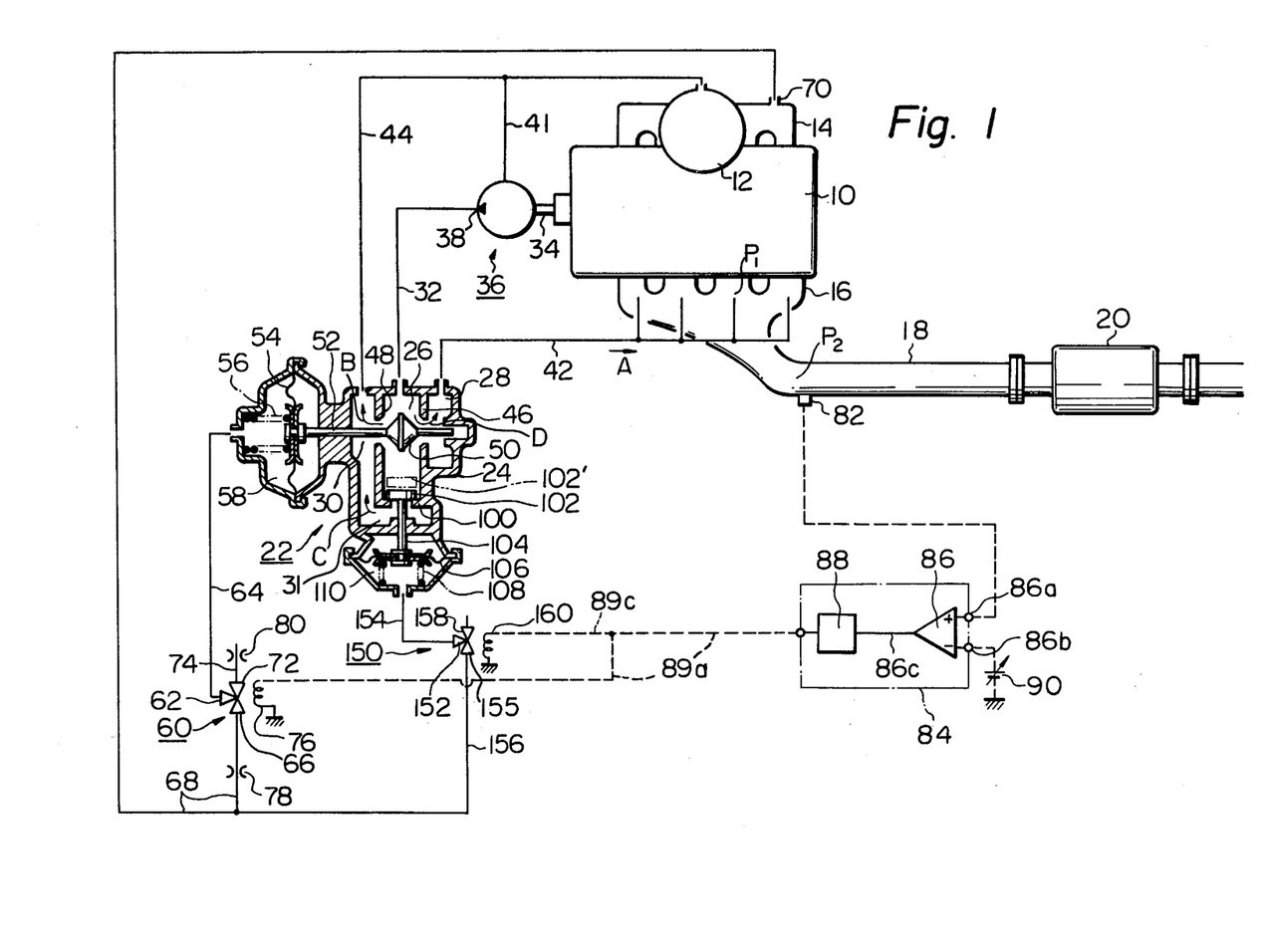
FIG. 1 is a schematic view of an exhaust gas cleaning apparatus according to the present invention.

In FIG. 1, showing a construction of the present invention, numeral 10 designates an engine body of an internal combustion engine. Intake air is introduced into combustion chambers (not shown) in the engine body 10, via an air cleaner 12, a carburetor (not shown) and an intake manifold 14. Resultant exhaust gas produced by the combustion in the combustion chamber is introduced into an exhaust manifold 16. Connected to the exhaust manifold 16 is an exhaust pipe 18 in which a three-way catalytic converter 20 is disposed. As is well-known to those skilled in this art, the three-way catalytic converter 20 can effectively eliminate three major toxic components remaining in the exhaust gas when the air-fuel ratio of the exhaust gas introduced into the converter 20 is kept in a range near the so-called stoichiometric ratio.

In FIG. 1 numeral 22 designates a diaphragm-operated flow control valve adapted for controlling the amount of secondary air introduced into the exhaust manifold 16, so that the air-fuel ratio is kept near the stoichiometric ratio to effectively operate the three-way catalytic converter 20. The flow control valve 22 has a body 24 for forming three air chambers 26, 28 and 30. The common air chamber 26 is connected, via a secondary air pipe 32, to an outlet 38 of an air pump 36 driven by a crankshaft 34 of the engine 10. An inlet 40 of the air pump 36 is connected, via a secondary air pipe 41, to a purified space in the air cleaner 12. Therefore, secondary air from the air cleaner 12 is introduced into the chamber 26 by the operation of the air pump 36 due to the rotation of the crankshaft 34 of the engine 10. The chamber 28 is connected to branch pipes of the exhaust manifold 16 by an air injection pipe 42 to introduce the secondary air into the exhaust manifold 16. The chamber 30 is opened to the atmosphere by a pipe 44 which connects the chamber 30 with the pipe 41. By this arrangement an excess amount of air is returned to the air cleaner 12. A valve seat 46 is formed between the chambers 26 and 28, and another valve seat 48 is formed between the chamber 26 and 30. A valve body 50 is located between the valve seats 46 and 48 for controlling the amount of secondary air directed to the chamber 28 from the common chamber 26. The valve member 50 is mechanically connected, via a rod 52, to a diaphragm 54 which is urged by a spring 56 toward the body 24. A vacuum signal chamber 58 is formed on one side of the diaphragm 54. When the chamber 58 is under a vacuum pressure, the diaphragm 54 is moved away from the body 24 and moved against the force of the spring 56. Thereby the position of the valve member 50 with respect to the valve seat 46 is varied in accordance with the level of vacuum pressure at the chamber 58. Accordingly, the amount of secondary air directed to the air injection pipe 42 via the valve seat 46 is controlled in accordance with the pressure level in the chamber 58.

Numeral 60 designates a vacuum switching valve of an electromagnetic type adapted for controlling the vacuum level in the signal chamber 58 of the flow control valve 22. The electromagnetic valve 60 has a common port 62, and two switching ports 66 and 72. The common port 62 is connected to the signal chamber 58 via a vacuum signal conduit 64. The first switching port 66 is connected to a vacuum signal port 70 formed in the intake manifold 14, via a vacuum signal conduit 68. The second switching port 72 is opened to the atmosphere via an atmospheric air conduit 74. The electromagnetic valve 60 has a solenoid coil 76 for operating the valve 60. When the solenoid coil 76 is energized, the valve 60 is in its first position in which the common port 62 communicates with the first switching port 66. In this first position, a vacuum signal at the vacuum signal port 70 can be introduced into the signal chamber 58 of the flow control valve 22, which signal introduction causes the valve member 50 to be moved away from the valve seat 46 for increasing the amount of secondary air directed to the air injection pipe 42. When the solenoid coil 76 is de-energized, the valve 60 is in its second position in which the common port 62 communicates with the second switching port 72. In this second position, atmospheric air from the conduit 74 is introduced into the signal chamber 58 of the flow control valve 22, thereby causing the valve member 50 to be moved toward the valve seat 46 for decreasing the amount of secondary air directed to the air injection pipe 42. Control orifices 78 and 80 are formed in the vacuum signal conduit 68 and in the atmospheric air conduit 74, respectively. These orifices 78 and 80 operate to control the speed of the movement of the valve member 50 of the flow control valve 22.

The flow control valve 22 further has a by-pass valve 102 for effecting a rapid increase of the small amount of air when the valve member 50 begins to move away from the valve seat 46 and for effecting a rapid decrease of the small amount of air when the valve member 50 begins to move toward the valve seat 46. The by-pass valve 102 faces a valve seat 100 which can communicate the air chamber 26 with the air chamber 30 via a by-pass passageway 31. The valve 102 is connected to a diaphragm 106 by a rod 104. The diaphragm 106 is urged upwardly by a spring 108 arranged in a by-pass control chamber 110 formed on one side of the diaphragm 106. When the chamber 110 is under a vacuum pressure of a predetermined level, a vacuum force on the diaphragm 106 causes the valve member 102 to be situated such that the valve member 102 is seated on the valve seat 100. Therefore, the air chamber 26 is disconnected from the by-passs passageway 31. When the vacuum chamber 110 is opened to the atmosphere, the force of the spring 108 causes the valve member 102 to be situated such that the member 102 is detached from the valve seat 100 as shown by the phantom lines 102' in FIG. 1. Thereby the air chamber 26 is communicated with the by-pass passageway 31.

Reference numeral 150 designates another electromagnetic type vacuum switching valve for selectively introducing a vacuum signal from the vacuum signal port 70 into the by-pass control chamber 110. The valve 150 with a construction which is substantially the same as that of the valve 60 has a common port 152, and two switching ports 155 and 158. The common port 152 is connected to the chamber 110 by a vacuum conduit 154. The first switching port 155 is opened to the vacuum signal port 70 by a vacuum conduit 156 connecting the port 155 with the vacuum signal conduit 68. The second switching port 158 is opened to the atmosphere. The valve 150 further has a solenoid coil 160 for operating the vacuum switching valve 150. When the solenoid coil 160 is energized, the valve 150 is caused to be located to a first position by which the common port 152 communicates with the first switching port 155. Thus, the by-pass control chamber 110 is opened to the vacuum signal port 70 via the vacuum conduit 154, the common port 152, the first switching port 155, the vacuum conduit 156 and the vacuum conduit 68. As a result, a vacuum force on the diaphragm 106 is produced for situating the by-pass valve 102 on the valve seat 100.

When the solenoid coil 160 is de-energized, the vacuum switching valve 150 is in its second position by which the common port 152 communicates with the second switching port 158. Thus, the by-pass control chamber 110 is opened to the atmosphere via the vacuum conduit 154, the common port 152 and the second switching port 158. As a result, a vaccum force is not produced in the by-pass control chamber 110. Accordingly, the by-pass valve 102 is detached from the valve seat 100.

Figure 2:
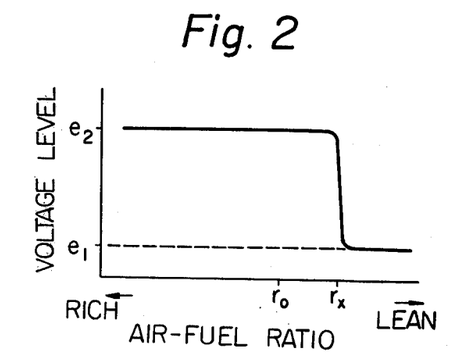
FIG. 2 is a curve indicating the output voltage of the $O_2$ sensor with respect to the air-fuel ratio.

An air-fuel ratio sensor 82 in the form of an oxygen concentration-cell, for example, an $O_2$ sensor, is arranged in the exhaust pipe 18. The $O_2$ sensor 82 operates to generate an electric signal in accordance with the difference between the concentrations of oxygen in the exhaust pipe 18 and in the atmosphere. When an excess amount of air remains in the exhaust pipe 18, in other words, when the air-fuel ratio of the exhaust gas is lean, the $O_2$ sensor 82 provides a low-level output signal $e_1$ as shown in FIG. 2, since the difference in the oxygen concentrations between the exhaust pipe 18 and the atmosphere is small. When excess fuel remains in the exhaust pipe 18, in other words, when the air-fuel ratio of the exhaust gas is rich, the $O_2$ sensor 82 can provide a high level output signal $e_2$ (FIG. 2) because the oxygen concentration difference is high. As is clear from the above, the $O_2$ sensor 82 provides two output signals $e_1$ and $e_2$ (FIG. 2) in accordance with the air-fuel ratio of the exhaust gas. The value of the air-fuel ratio at which the change of the output level from $e_1$ to $e_2$ or from $e_2$ to $e_1$ in FIG. 2 occurs is $r_x$. As is well-known to those skilled in this art, such a value $r_x$ is higher than the stoichiometric value $r_0$ at which excess air and excess fuel are not left in the exhaust gas. At this stoichiometric value $r_0$ an idealized cleaning operation of the three-way catalytic converter 20 can be attained.

Reference numeral 84 is a control unit for operating the electromagnetic valves 60 and 150 in accordance with electric signals transmitted from the $O_2$ sensor 82. The control unit 84 comprises a comparator 86 including an input 86a connected to the $O_2$ sensor 82, another input 86b connected to a battery 90, an output 86c and an amplifier unit 88. The input level at the input 86b due to the battery B is adjusted so that it is located between the levels $e_1$ and $e_2$ (FIG. 2). As a result, the comparator 86 provides an output signal at the output 86c when the rich signal $e_2$ (FIG. 2) is received by the input 86a from the $O_2$ sensor 82 due to the fact that the air-fuel ratio of the exhaust gas is smaller than the value $r_x$ (FIG. 2). The output signal is received by the amplifier unit 88. The comparator 86 does not provide any signal at the output 86c connected to the amplifier unit 88, when the lean signal $e_1$ (FIG. 2) is received by the input 86a from the $O_2$ sensor due to the fact that the air-fuel ratio is higher than the value $r_x$.

The amplifier unit 88 of the controller 88 is electrically connected to the solenoid coil 76 of the vacuum switching valve 60 via an electrical line 89 as well as to the solenoid coil 160 of the second vacuum switching valve 150 via an electric line 89c. Thus, the two valves 60 and 150 are synchronously operated by a signal transmitted from the control unit 84.

The operation of the apparatus described hereinbefore is as follows.

When a lean signal $e_1$ (FIG. 2) is issued from the $O_2$ sensor 82 because of a lean air-fuel ratio of the exhaust gas at a position $P_2$ of the exhaust pipe 18 located near the $O_2$ sensor 82, the above-mentioned controller unit 84 does not provide any electric signal at the output 88b of the amplifier unit 88 for energizing the solenoid 76 of the first vacuum switching valve 60 as well as the solenoid coil 160 of the second vacuum switching valve 150. Therefore, the valve 60 is in its second position by which the common port 62 communicates with the second port 72 opened to the atmosphere. Consequently, the vacuum level in the chamber 58 is gradually decreased toward the level of atmospheric pressure because of the existence of the control orifice 80. Furthermore, the valve member 50 is gradually moved toward the valve seat 46 for decreasing the amount of secondary air directed to the air injection pipe 42 via the chamber 28. The speed of movement of the valve member 50 toward the valve seat 46 corresponds to the internal diameter of the control orifice 80. Consequently, the amount of secondary air introduced into the exhaust manifold 16 via the air injection pipe 42 as shown by the arrow A in FIG. 1 is gradually decreased. Therefore, the air-fuel ratio of the exhaust gas in the exhaust manifold 16 at a position $P_1$ (FIG. 1), where the pipe 42 is connected to the manifold 16, is decreased as shown by the line $m_1$ in FIG. 3. The rate of the decrease of the air-fuel ratio (in other words, the inclination of the line $m_1$) corresponds to the rate of introducing atmospheric air into the chamber 58, i.e., the inner diameter of the control orifice 80.

In this second position of the first vacuum switching valve 60, the second vacuum switching valve 150 is also located in its second position by which the common port 152 communicates with the second switching port 158, so that the by-pass valve 102 is detached from the valve seat 100 as shown by the phantom lines 102' in FIG. 1. The excessive secondary air in the air chamber 26 which is not directed to the air chamber 28 is discharged to the air chamber 30 via the valve seat 48 as shown by an arrow B in FIG. 1 and via the by-pass passageway 31 as shown by an arrow C in FIG. 1. The excessive air is returned to the air cleaner 12 via the pipe 44.

Figure 3:
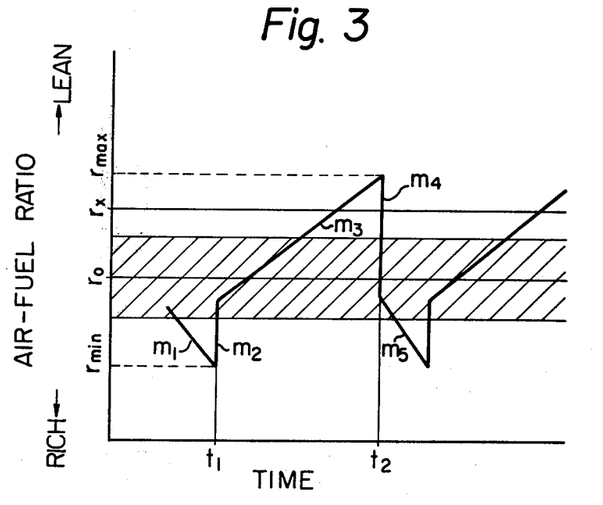
FIG. 3 is a graph showing changes of the air-fuel ratio of the exhaust gas in the exhaust system of the engine shown in FIG. 1, in which the y-coordinate schematically indicates an air-fuel ratio of the exhaust gas at a location $P_1$ in FIG. 1 and the x-coordinate indicates time.

As a result of decreasing the air-fuel ratio at the location $P_1$ (FIG. 1) as shown by the line $m_1$ (FIG. 3), the air-fuel ratio at the location $P_2$ situated downstream of the location $P_1$ reaches the value $r_x$ (FIG. 2) at a time $t_1$ in FIG. 3. At this time $t_1$, the air-fuel ratio of the location $P_1$ is as low as the value r min. Thus, the $O_2$ sensor 82, at the time $t_1$ provides a rich signal $e_2$ (FIG. 2) indicating that the air-fuel ratio of the location $P_2$ has become lower than the stoichiometric value $r_x$. The rich signal $e_2$ (FIG. 2) issued from the $O_2$ sensor is received by the input 86a of the comparator 86, for causing the comparator 86 to provide an output signal at the output 86c. The output signal is transmitted via the amplifier 88 into the solenoid coil 76 of the first valve 60 via the electric line 89a, and into the solenoid coil 160 of the second vacuum switching valve 150 via the electric line 89c. Thus, the solenoid coils 76 and 160 are energized to cause the first and second valves 60 and 150 to be switched to their first positions, respectively. Because the valve 60 is in its first position, the vacuum port 70 in the intake manifold 14 is opened to the signal chamber 58 of the flow control valve via the conduit 68, the first switching port 66, the common port 62, and the conduit 64. As a result, the vacuum level in the chamber 58 is increased. The valve member 50 is therefore moved away from the valve seat 46. In addition, the decrease of the air-fuel ratio at the location $P_1$ (FIG. 1), as shown by the line $m_1$ in FIG. 3, is stopped at the time $t_1$ (FIG. 3).

The second position of the vacuum switching valve 150 causes a vacuum signal to be transmitted into the by-pass control chamber 110 from the vacuum signal port 70. Thus, the vacuum force on the diaphragm 106 causes the by-pass valve 102 to rest on the valve seat 100 for instantly preventing the air in the chamber 26 from being diverted into the by-pass passageway 31 when the valve member 50 begins to move toward the valve seat 46 at the time $t_1$ (FIG. 3). Accordingly, a rapid increase of the small amount of secondary air directed to the air chamber 28 from the air chamber 26 as shown by the arrow D in FIG. 1 occurs when the by-pass valve 102 is seated on the valve seat 100. A rapid increase of the air-fuel ratio of the small amount of secondary air occurs as shown by the line $m_2$ at the time $t_1$ in FIG. 3. As a result, the air-fuel ratio of the exhaust gas quickly reaches a value near the stoichiometric value $r_0$.

After the time $t_1$ (FIG. 3), the valve 50 continues to move away from the valve seat 46 due to the introduction of a vacuum signal from the vacuum signal port 70 into the chamber 58. The air-fuel ratio of the exhaust gas at the location $P_1$ is thereby gradually increased as shown by the line $m_3$ in FIG. 3. The rate of increase of the air-fuel ratio corresponds to the rate of introducing a vacuum signal into the chamber 58, i.e., the inner diameter of the orifice 78.

As a result of the increase of the air-fuel ratio as shown by the line $m_3$ in FIG. 3 at the location $P_1$ in FIG. 1, the air-fuel ratio at the location $P_2$ near the $O_2$ sensor 82 exceeds the value $r_x$. Thus, the $O_2$ sensor provides a lean signal $e_1$ (FIG. 2) which is received by the controller 84 at a time $t_2$ of FIG. 3. At this time $t_2$, the air-fuel ratio of the location $P_1$ is as high as the value r maximum. Consequently, the controller 84, as described hereinbefore, does not provide any output signal. The solenoid coil 76 as well as the solenoid coil 160 are de-energized, so that the first and the second vacuum switching valves 60 and 150 are switched to their second positions, respectively. Due to the second position of the vacuum switching valve 60, the signal chamber 58 is opened to the atmosphere to cause the valve member 50 to move toward the valve seat 46.

The second position of the second vacuum switching valve causes the by-pass control chamber 110 to be opened to the atmosphere. Accordingly, when the valve member 50 begins to move toward the valve seat 46 at the time $t_2$ (FIG. 3) for decreasing the amount of secondary air directed toward the air chamber 28 from the chamber 26, as shown by the arrow D in FIG. 1, the by-pass valve 102 is instantly detached from the valve seat 100 as shown by the phantom lines 102' in FIG. 1. Thereby the air chamber 26 is caused to communicate with the by-pass passageway 31 for diverting an amount of air from the chamber 26 into the passageway 31 as shown by the arrow C (in FIG. 1). As a result, rapid decrease of a small amount of secondary air directed toward the chamber 28 from the chamber 26 as shown by the arrow D in FIG. 1 occurs when the by-pass valve 102 is detached from the valve seat 100. Furthermore, a rapid decrease of the air-fuel ratio occurs as shown by the line $m_4$ at the time $t_2$ (FIG. 3). Consequently the air-fuel ratio of the exhaust gas quickly reaches a value near the stoichiometric value $r_0$ (FIG. 3).

After the time $t_2$ (FIG. 3), the valve 50 continues to move toward the valve seat 46, due to the introduction of atmospheric air into the chamber 58. The air-fuel ratio of the exhaust gas is thus gradually decreased as shown by a line $m_5$ in FIG. 3.

As described above, a rapid increase of the air-fuel ratio as shown by the line $m_2$ or a rapid decrease of the air-fuel ratio as shown by the line $m_4$ occurs when the first and second vacuum switching valves 60 and 150, which are synchronously operated by the control unit 84, are used. According to the invention, the air-fuel ratio of the exhaust gas, the changes of which are respectively shown by the lines $m_1$ through $m_5$ in accordance with a lapse of time, is effectively maintained in a range near the stoichiometric value, which range is represented by the shaded lines in FIG. 3. As a result, an effective operation of the catalytic converter 20 is attained for cleaning the three major toxic components in the exhaust gas.

Figure 4:
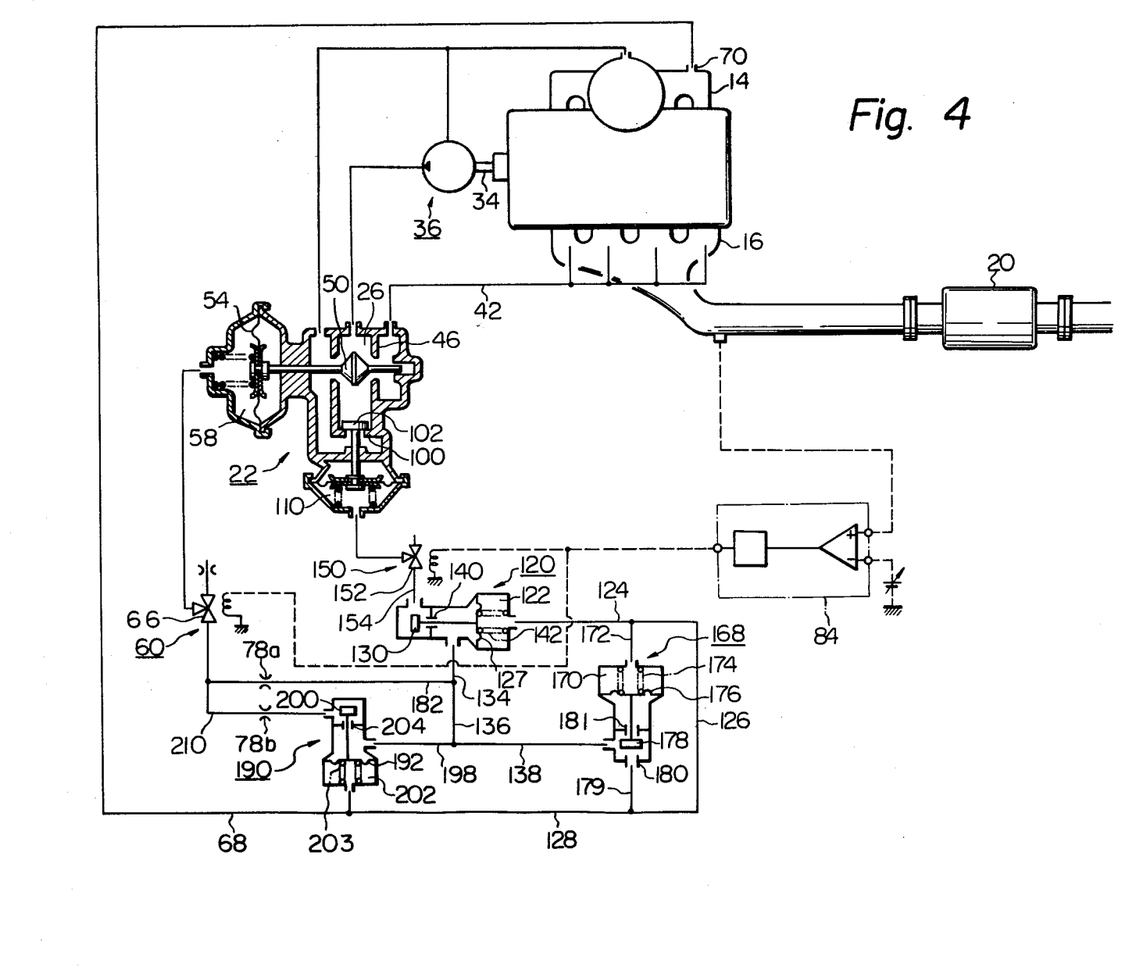
FIGS. 4, 5 and 6 respectively show a further embodiment of the present invention.

Another embodiment shown in FIG. 4 has additional control elements for effectively operating the apparatus of FIG. 1 when this embodiment is utilized in the internal combustion engine of a motor vehicle.

A vacuum ON-OFF valve 120 is adapted for carrying out the above-mentioned operation of the by-pass valve for effecting the above-mentioned rapid increase or decrease of the small amount of secondary air, only when the engine is operating under accelerating conditions. When the engine is operating under such accelerating conditions, the amount of secondary air introduced into the common air chamber 26 is small due to the rotational speed of the air pump 36 driven by the crankshaft 34. Accordingly the rapid increase or decrease of the amount of the secondary air as shown by the line $m_2$ or $m_4$ of FIG. 3 is quite necessary for quickly increasing or decreasing the air-fuel ratio toward the stoichiometric value $r_0$. When the engine is not accelerated the rapid increasing or decreasing operation of the by-pass valve 102 is not necessary since the amount of secondary air introduced into the chamber 26 from the air pump 36 is large due to the high rotational speed of the crankshaft 34.

The vacuum ON-OFF valve 120 has a diaphragm 127 which forms a vacuum chamber 122 on one side of the diaphragm 127. The vacuum chamber 122 is connected to the vacuum port 70 in the intake manifold 14 by way of vacuum conduits 124, 126, 128 and 68. The diaphragm 127 is connected to a valve member 130 which faces a valve seat 140. A spring 142 urges the diaphragm 127 so that the valve member 130 is moved away from the valve seat 140. The valve seat 140 operates to selectively cause the first switching port 152 of the second vacuum switching valve 150 to communicate with a vacuum tube 134 which is connectable to the vacuum port 70 via vacuum conduits 136 and 138, a valve 168, and a vacuum conduit 179 connected to the conduits 128 and 68.

Operation of the Vacuum Valve 120

When the engine is not accelerated, the vacuum level at the port 70 is high due to a small degree of the throttle opening. Thus, the vacuum level at the vacuum chamber 122 of the vacuum ON-OFF valve 120 is high enough to cause the diaphragm 127 to be moved so that the valve member 130 is rested on the valve seat 140. The first switching port 152 is then disconnected from the vacuum conduit 134. Consequently, introduction of a vacuum signal from the vacuum port 70 into the second switching port 158 is prevented. The chamber 110 is always under an atmospheric pressure which is high enough to cause the by-pass valve 102 to be detached from the valve seat 100. As a result, a rapid increase or decrease of the air-fuel ratio, as shown by the line $m_2$ or $m_4$ in FIG. 3, does not occur.

When the engine is under acceleration, the vacuum level at the port 70 is low due to a large degree of the throttle opening. Threfore, the vacuum level at the vacuum chamber 122 is low enough to cause the diaphragm 127 to be moved so that the valve member 130 is detached from the valve seat 140. The connection of the first switching port 152 with the vacuum conduit 134 is thus attained so that a vacuum signal at the vacuum port 70 can be transmitted to the by-pass control chamber 110 when the second vacuum switching valve 150 is situated in the first position, as a result of the electric signal being transmitted from the control unit 84. Accordingly, the rapid increase or decrease of the air-fuel ratio, as shown by the line $m_2$ or $m_4$ of FIG. 3, is attained when the engine is under accelerating conditions.

The valve 168 is adapted for preventing the introduction of secondary air from the flow control valve 22 into the air-injection pipe 42 when the engine is operating under a high load condition of a high rotational speed for preventing the catalytic converter 20 from being overheated. The valve 168 has a diaphragm 176 which forms a vacuum chamber 170 on one side thereof. The vacuum chamber 170 is opened to the side of the vacuum signal port 70 in the intake manifold 14 by a vacuum conduit 172 connected to the vacuum conduits 124 and 126. The diaphragm 176 is connected to a valve member 178 disposed between valve seats 180 and 181. The valve member 178 selectively communicates a vacuum conduit 179 with vacuum conduits 136 or 138. The conduit 138 is connected to a vacuum conduit 182 connected to the first vacuum switching valve 60.

Operation of the Valve

When the engine is operating under a high load condition of a high rotational speed, the vacuum level at the vacuum port 70 is very low. Therefore, the vacuum level at the vacuum chamber 170 connected to the port 70 via the vacuum conduits 172, 126, 128 and 63 becomes low enough to cause the diaphragm 176 to be moved so that the valve member 178 rests on the valve seat 180. Accordingly, introduction of a vacuum signal into the vacuum conduit 138 from the vacuum conduit 179 is prevented. As a result, introduction of a vacuum signal into the vacuum switching valve 60 from the conduit 138 is prevented. In addition, the vacuum signal chamber 58 is always under atmospheric pressure which causes the diaphragm 54 to move so that the valve member 50 rests on the valve seat 46. Consequently, the air in the air chamber 26 is not directed to the air-injection pipe 42. The catalytic converter 20 is thus prevented from being overheated during the high load condition of the high rotational speed.

A vacuum control valve 190 is adapted to maintain a substantially constant speed for introducing the vacuum signal at the port 70 into the first vacuum switching valve 60. An effective air control operation by the valve 22 can thereby be attained. The vacuum control valve 190 has a diaphragm 192 forming a vacuum chamber 202 connected to the vacuum conduit 68. The diaphragm 192 urged by a spring 203 is connected to a valve member 200 facing the valve seat 204 for selectively connecting a vacuum conduit 198 with a vacuum conduit 210. The conduit 210 has an orifice 78$b$ which is larger than an orifice 78$a$ in the vacuum conduit 182.

Operation of the Vacuum Control Valve 190

When the engine is operating under a low load condition in which the vacuum level at the port 70 is high, the valve member 200 rests on the valve seat 204 because the vacuum level of the chamber 202 is high enough to cause the diaphragm 192 to be moved downwardly against the spring 203. The conduit 210 provided with the large orifice 78$b$ is thus disconnected from the vacuum conduit 198. The high level vacuum signal at the vacuum port 70 is introduced into the first vacuum switching valve 60 via the conduits 68, 128 and 179, the valve 168, and the conduits 136, 138 and 182. Accordingly, the rate of increase of the vacuum signal level in the chamber 58 is controlled to a predetermined value by the orifice 78$a$ exhibiting the small inner diameter, even if the vacuum level at the port 70 is high.

When the engine is operating under a high load condition in which the vacuum level at the port 70 is low, the valve member 200 is detached from the valve seat 204 because the vacuum level of the chamber 202 is low enough to cause the diaphragm 192 to be moved upwardly by the spring 203. The conduit 210 is thereby connected to the vacuum conduit 198. Consequently, the low level vacuum signal at the port 70 is introducled into the first vacuum switching valve 60 via the conduits 68, 128 and 179, the valve 168, the conduits 138 and 198, the vacuum control valve 190 and the vacuum conduit 210 comprising the orifice 78$b$. As a result, the rate of increase of the vacuum signal level in the chamber 58 is controlled to the predetermined value by the orifice 78$b$ exhibiting the large inner diameter, even if the vacuum level at the vacuum port 70 is low.

Figure 5:
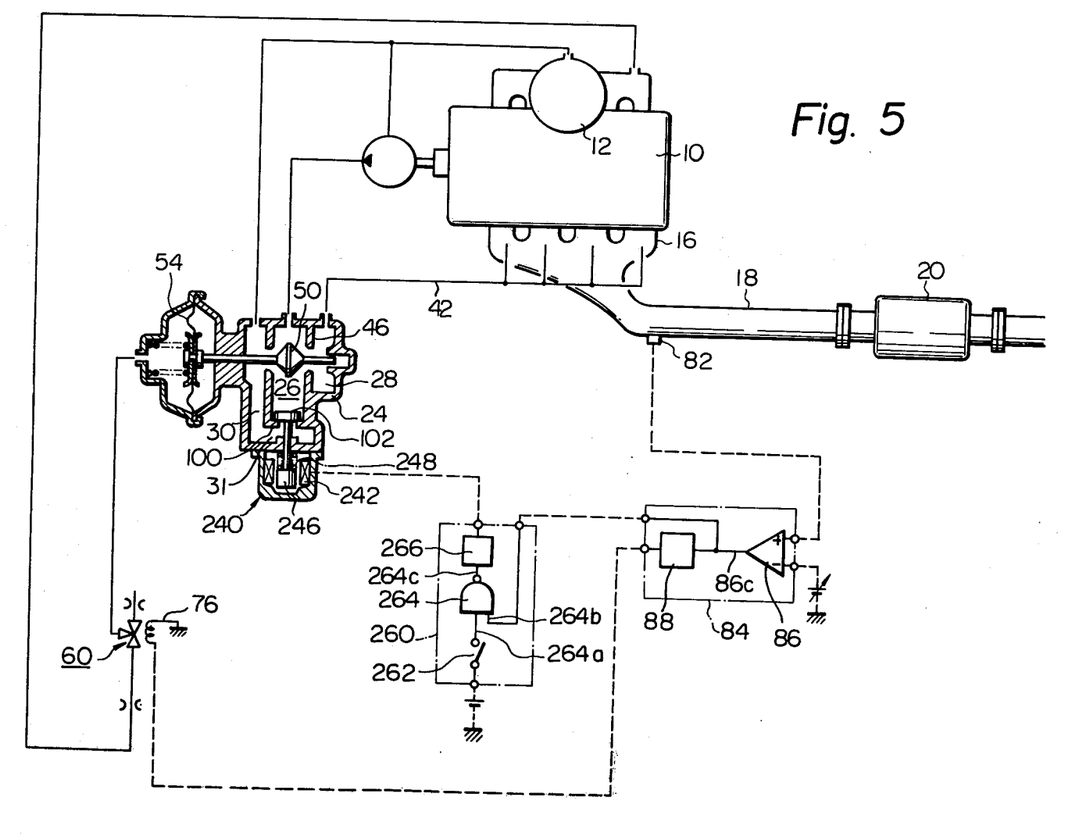

The apparatus shown in FIG. 5 is different from the apparatus shown in FIG. 1 in that the by-pass valve 102 is operated by a solenoid mechanism 240 which has a spring-urged operating piece 246 connected to the by-pass valve 102. The solenoid mechanisim 240 has a solenoid coil 242 disposed around the operating piece 246. When the solenoid coil 242 is energized, the operating piece 246 is moved upwardly by an electromagnetic force produced by the energized coil 242, so that the by-pass valve 102 is detached from the valve seat 100 for permitting the common air chamber 26 to be connected with the by-pass passageway 31. When the solenoid coil 242 is de-energized, the operating piece 246 is moved downwardly by the force of the spring 248, so that the by-pass valve 102 rests on the valve seat 100, for causing the air chamber 26 to be disconnected from the by-pass passageway 31.

An electrical circuit 260 operates to provide a signal for selectively energizing the solenoid mechanism 240 so that the by-pass valve 102 is synchronously opened between the first position and the second position with the switching of the first vacuum switching valve 60. Thus, a rapid increase or decrease of the air-fuel ratio, as shown by the line $m_2$ or $m_4$ in FIG. 3, is attained. The electrical circuit 260 comprises a NAND gate 264 comprising two inputs 264a and 264b. The input 264a is connected to a well-known switch device 262 for sensing the engine accelerating condition by detecting the opening of the throttle valve. When the engine begins to accelerate, the switch 262 is moved to its ON position, so that an electric signal is received by the input 264a of the NAND gate 264. The other input 264b of the NAND gate 264 is connected to the output 86c of the comparator 86 of the control unit 84. The output 264c is connected to the solenoid coil 242 of the solenoid mechanism 240 via an amplifier unit 266. As is well known, the NAND gate 264 operates to provide an electric signal at the output 264c except when the inputs 264a and 264b both receive an input signal. Thus, the solenoid coil 242 is energized to cause the by-pass valve 102 to be detached from the valve seat 100. An output signal is not generated on the output 264c when both the inputs 264a and 264b receive input signals, for de-energizing the solenoid coil 242.

As a result, the by-pass valve 102 rests on the valve seat 100.

The operation of the apparatus shown in FIG. 5 is as follows.

Acceleration Condition

During engine acceleration, the switch 262 is in its ON condition to provide a signal into the input 264a of the NAND gate.

When a rich signal $e_2$ (FIG. 2) from the $O_2$ sensor 82 is received by the comparator 86 of the control unit 84, an output signal is generated at the output 86c. This output signal is received by the solenoid coil 76 of the vacuum switching valve 60 for moving the valve 60 to its first position. The valve member 50 is thereby caused to be moved away from the valve seat 46 for increasing the secondary air directed to the air injection pipe 42. The output signal at the output 86c is also received by the input 264b of the NAND gate 264 of the electrical circuit 260. No output signal is generated on the output 264c of the NAND gate 264, so that the solenoid coil 242 is de-evergized for causing the by-pass valve 102 to rest on the valve seat 100. As described hereinbefore with reference to the first embodiment in FIG. 1, a rapid increase of a small amount of secondary air occurs when the valve member 50 begins to move away from the valve seat 46. As a result, a quick increase of the air-fuel ratio as shown by the line $m_2$ in FIG. 3 occurs.

When a lean signal $e_1$ (FIG. 2) from $O_2$ sensor 82 (FIG. 5) is received by the comparator 86, no output signal is generated at the output 86c thereof for de-energizing the vacuum switching valve 60. The valve member 50 is then caused to be moved toward the valve seat 46 for decreasing the amount of secondary air directed to the air injection pipe 42. There is no signal at the output 86c connected to the input 264b of the NAND gate 264 to cause an output signal to be generated on the output 264c. The output signal is introduced into the solenoid mechanism 240 via the amplifer unit 266 for detaching the by-pass valve 102 from the valve seat 100. Therefore, a rapid decrease of the small amount of the secondary air occurs when the valve member 50 begins to move toward the valve seat 46. As a result, a quick decrease of the air-fuel ratio as shown by the line $m_4$ in FIG. 3 occurs.

Normal Running Condition

During the time when the engine is not under acceleration, the switch 262 is opened, and no signal is received by the input 264 of the NAND gate 264. Due to this condition, the NAND gate 264 can always provide a signal at the output 264c for energizing the solenoid coil 242. Thus, the by-pass valve 102 always remains detached from the valve seat 100 during the time when the engine is not being accelerated. As a result the quick increase or decrease of the air-fuel ratio does not occur.

Figure 6:
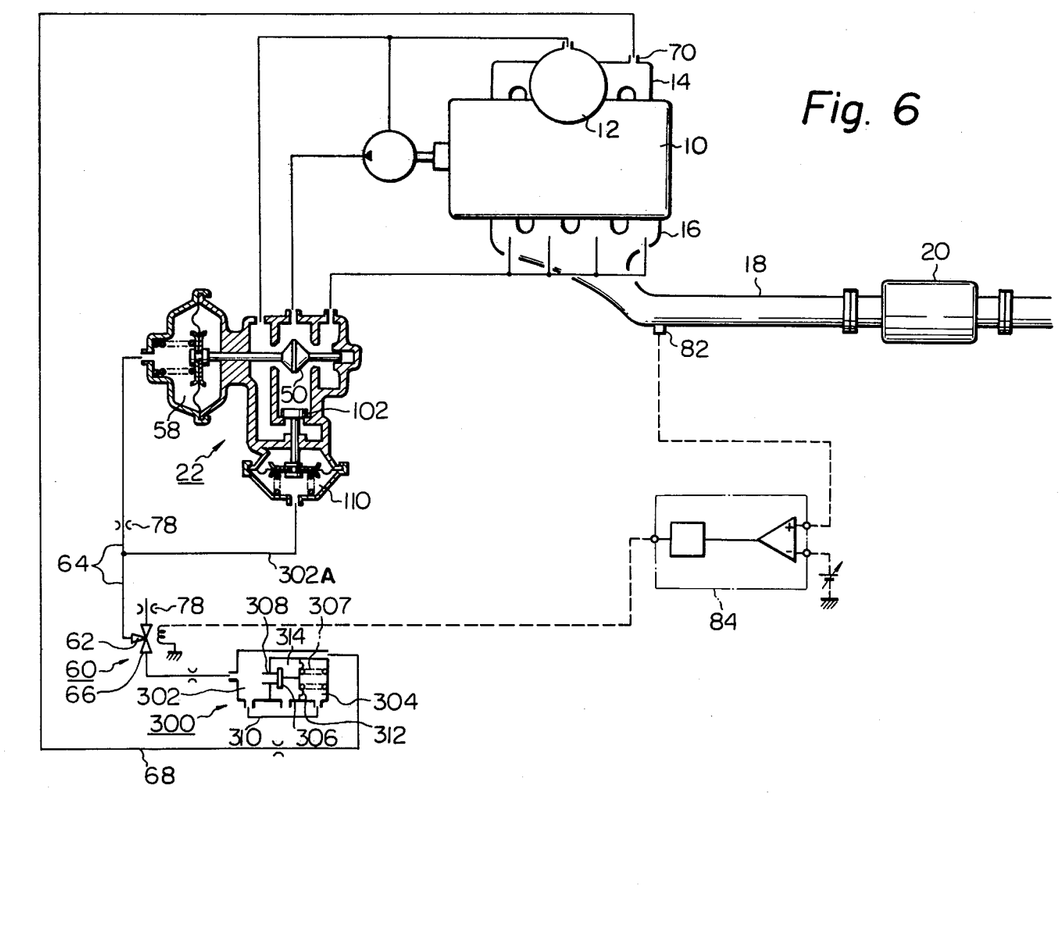

Another modification of the apparatus of FIG. 1 is shown in FIG. 6. This modification has a vacuum control valve 300 located on the vacuum signal conduit 68 which connects the vacuum signal port 70 in the intake manifold 14 with the first switching port 66 of the vacuum switching valve 60. The vacuum control valve 300 operates to maintain a predetermined constant level of the vacuum signal introduced into the vacuum switching valve 60. The vacuum control valve has a chamber 302 connected to a vacuum control chamber 304 by means of a tube 310, formed on one side of a diaphragm 312 urged by a spring 307. The diaphragm 312 is connected to a valve member 306 facing a valve seat 308 for selectively connecting the vacuum chamber 302 with a chamber 314 opened to the atmosphere.

When the vacuum level in the chamber 302 becomes higher than a predetermined value, the vacuum pressure in the vacuum control chamber 304 connected to the chamber 302 becomes high enough to cause the valve member 306 to be detached from the valve seat 308 so that the chamber 302 communicates with the air chamber 314. Accordingly, the vacuum level in the chamber 302 is decreased to the predetermined value.

When the vacuum level in the chamber 302 becomes lower than the predetermined value, the vacuum pressure in the vacuum control chamber 304 becomes low enough to cause the valve member 306 to rest on the valve seat 308 so that the vacuum chamber 302 is disconnected from the air chamber 314. The vacuum level in the chamber 302 is thus increased to the predetermined value.

As is clear from the above description, the embodiment in FIG. 6 is advantageous since the vacuum signal transmitted into the vacuum switching valve 60 from the vacuum control valve can be kept to a constant sufficient level irrespective of the vacuum level at the vacuum port 70.

The by-pass control chamber 110 is connected, via a vacuum conduit 302A, to a vacuum conduit 64 connected the vacuum switching valve 60 with the vacuum signal chamber 58 of the flow control valve 22. In other words, because both the valve member 50 and the by-pass valve 102 are synchronously operated by the single vacuum switching valve 60, a compact construction of the apparatus can be realized.

What is claimed is:

1. An exhaust gas cleaning apparatus for an internal combustion engine, said apparatus comprising:

a three-way catalytic converter, arranged in the exhaust system of said engine, for effectively eliminating toxic components remaining in the exhaust gas when the air-fuel ratio of the exhaust gas directed to said converter is kept near a stoichiometric value;

air pump means driven by the crankshaft of said engine;

pipe means connected on one end thereof to said air pump means for receiving secondary air from said air pump means and connected on the other end thereof to said exhaust system at a position located upstream of said catalytic converter for introducing secondary air into said exhaust system;

a flow control valve means having an air chamber located on said pipe means, said valve means has a diaphragm for forming a vacuum chamber on one side thereof, said diaphragm operating to control the amount of secondary air directed from said air chamber toward said exhaust system in accordance with the vacuum pressure level in said vacuum chamber, an outlet on said air chamber communicating with said other end, said valve means coacting with said outlet to control air flow therethrough;

a vacuum switching valve means capable of selectively communicating said vacuum chamber with the engine intake system for controlling the amount of secondary air passed through said flow control valve means;

a sensor means arranged in the exhaust system for detecting a predetermined value of the air-fuel ratio near said stoichiometric value;

a control unit for operating said vacuum switching valve means in such a manner that said switching valve means is in a first position when a first electric signal, which indicates that the air-fuel ratio is smaller than the predetermined value, is received by said control unit to increase the amount of secondary air directed into said exhaust system from said air chamber of said flow control valve means, and in such a manner that said switching valve means is in a second position when another electric signal, which indicates that the air-fuel ratio is larger than the predetermined value, is received by said control unit for decreasing the amount of secondary air directed into said exhaust system from said air chamber;

a by-pass valve means for selectively connecting said air chamber with the atmosphere; and an actuator means connected to said control unit for operating said by-pass valve means in such a manner that said by-pass valve means is situated so that said air chamber is disconnected from the atmosphere when said vacuum switching valve means is switched to its first position, so as to cause a rapid increase of a limited amount of secondary air directed to said exhaust system for quickly increasing the air-fuel ratio to a value near said stoichiometric value, and in such a manner that said by-pass valve is situated so that said air chamber is connected with the atmosphere when said vacuum switching valve means is switched to its second position, so as to cause a rapid decrease of a small amount of secondary air for quickly decreasing the air-fuel ratio to a value near said stoichiometric value, whereby the air-fuel ratio of the exhaust gas directed to said three-way catalytic converter is effectively maintained near said stoichiometric value for producing an idealized operation of said converter.

2. An exhaust gas cleaning apparatus according to claim 1, wherein said actuator means comprises:

a diaphragm mechanism having a diaphragm connected to said by-pass valve means, said diaphragm forming a by-pass control chamber on one end thereof, said air chamber being selectively connected with the atmosphere in accordance with the vacuum level in said by-pass control chamber;

and a second signal switching valve means operated by said control unit for controlling said transmission of a vacuum signal from said engine intake system into said by-pass control chamber in accordance with said first and second electrical signals transmitted from said sensor means.

3. An exhaust gas cleaning apparatus according to claim 1, wherein said actuator means comprises:

a solenoid mechanism connected to said by-pass valve means; and an electric circuit connected to said control unit for operating said solenoid mechanism in such a manner that said by-pass valve means is selectively connected to the atmosphere in accordance with said electric signal transmitted from said sensor means.

4. An exhaust gas cleaning apparatus according to claim 1, wherein said actuator means comprises a diaphragm mechanism having a diaphragm connected to said by-pass valve means, said diaphragm forming a by-pass control chamber on one end thereof which is connected to a conduit connecting said vacuum switching valve means with said vacuum chamber of said flow control valve means so that the connection of said air chamber with the atmosphere is synchronously controlled with the switching of said vacuum switching valve means, and wherein a means is provided on a conduit means connecting said vacuum switching valve means with a vacuum port in the engine intake system for maintaining a constant vacuum level in said conduit means regardless of the engine operating condition.

5. An exhaust gas cleaning apparatus according to claim 2, further comprising a vacuum means for controlling the vacuum pressure level in said diaphragm mechanism so that said by-pass valve means is always situated so that said air chamber of said flow control valve means communicates with the atmosphere by detecting a vacuum level of said engine intake system during the time when said engine is not being accelerated, whereby said rapid secondary air increasing and decreasing operation is carried out when said engine is under acceleration.

6. An exhaust gas cleaning apparatus according to claim 3, wherein said electrical circuit has an electrical element for providing an electric signal for operating said solenoid mechanism in order that said by-pass valve means is always situated for communicating said air chamber of said flow control valve means with the atmosphere by electrically detecting that the engine is not being accelerated, whereby the operation for rapidly increasing and decreasing the amount of secondary air is carried out during the time when said engine is under acceleration.

7. An exhaust gas cleaning apparatus according to claim 6, wherein said electrical element comprises a NAND gate having two inputs and an output, and a switch for detecting a position of the engine throttle valve, one of said inputs being connected to said control unit, the other input being connected to said switch, the output being connected to said solenoid mechanism.

8. An exhaust gas cleaning apparatus according to claim 1, further comprising a vacuum means for controlling the vacuum pressure level in said vacuum chamber of said flow control valve means so that secondary air in said air chamber is not directed toward said exhaust system, when said engine is operating under a high load condition of a high rotational speed.

9. An exhaust gas cleaning apparatus according to claim 1, further comprising a vacuum control means for introducing a vacuum signal in said intake system via an orifice with larger inner diameter when the vacuum level at said intake system is low for maintaining a substantially constant rate of introducing a vacuum signal into said vacuum chamber of said flow control valve means.

* * * * *